United States Patent
Hammud et al.

(10) Patent No.: US 12,128,390 B1
(45) Date of Patent: Oct. 29, 2024

(54) TRI-METALLIC ORGANIC FRAMEWORK (MOF) COMPLEX AS A REDUCTION CATALYST

(71) Applicant: KING FAISAL UNIVERSITY, Al-Ahsa (SA)

(72) Inventors: Hassan H. Hammud, Al-Ahsa (SA); Waleed A. Aljamhi, Al-Ahsa (SA); Khurshid Ayub, Abbottabad (PK)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/584,581

(22) Filed: Feb. 22, 2024

(51) Int. Cl.
| | | |
|---|---|---|
| *B01J 31/16* | (2006.01) | |
| *B01J 21/18* | (2006.01) | |
| *B01J 31/18* | (2006.01) | |
| *B01J 31/22* | (2006.01) | |
| *B01J 35/00* | (2024.01) | |
| *B01J 37/02* | (2006.01) | |
| *B01J 37/03* | (2006.01) | |
| *B01J 37/04* | (2006.01) | |
| *B01J 37/06* | (2006.01) | |
| *B01J 37/08* | (2006.01) | |
| *B01J 37/34* | (2006.01) | |
| *C02F 1/70* | (2023.01) | |
| *C07F 19/00* | (2006.01) | |
| *C02F 101/30* | (2006.01) | |

(52) U.S. Cl.
CPC ........... *B01J 31/1691* (2013.01); *B01J 21/18* (2013.01); *B01J 31/1815* (2013.01); *B01J 31/2226* (2013.01); *B01J 31/223* (2013.01); *B01J 35/00* (2013.01); *B01J 37/0236* (2013.01); *B01J 37/031* (2013.01); *B01J 37/04* (2013.01); *B01J 37/06* (2013.01); *B01J 37/08* (2013.01); *B01J 37/343* (2013.01); *C02F 1/705* (2013.01); *C07F 19/00* (2013.01); *B01J 2531/54* (2013.01); *B01J 2531/845* (2013.01); *B01J 2531/847* (2013.01); *C02F 2101/308* (2013.01)

(58) Field of Classification Search
CPC .. B01J 31/1691; B01J 31/181; B01J 31/2226; B01J 31/223; B01J 21/18; B01J 35/00; B01J 37/0236; B01J 37/031; B01J 37/04; B01J 37/06; B01J 37/08; B01J 37/343; B01J 2531/54; B01J 2531/845; B01J 2531/847; C02F 1/705; C02F 2101/308; C07F 19/00
See application file for complete search history.

(56) References Cited

U.S. PATENT DOCUMENTS 11,826,731 B1 * 11/2023 Hammud ............. B01J 23/8437

OTHER PUBLICATIONS

Mensah-Darkwa et al., Fuel 335, 127056, pp. 1-18 (2023). (Year: 2023).*
Md. Ariful Ahsan et al., Carbonization of Co-BDC MOF results in magnetic C@Co nanoparticles that catalyze the reduction of methyl orange and 4-nitrophenol in water, DOI:10.1016/j.molliq.2019.111059 (2019).
Shiwang Hu et al., A simple coordination complex-derived NiS nanocatalyst for reduction of 4-nitrophenol and methyl orange, DOI: https://doi.org/10.1016/j.inoche.2020.108428(2021).
Liyu Chen, et al., Bimetallic metal-organic frameworks and their derivatives, DOI: 10.1039/DOSC01432J (2020).
Hongmei Chen et al., Co3O4—Ag photocatalysts for the efficient degradation of methyl orange, DOI: https://doi.org/10.1039/C9RA10437B (2020).
Misbah Naz, et al., Elimination of dyes by catalytic reduction in the absence of light: A review, DOI: https://doi.org/10.1007/s10853-021-06279-1 (2021).
Pitchaimani Veerakumar, Nickel Nanoparticle-Decorated Porous Carbons for Highly Active Catalytic Reduction of Organic Dyes and Sensitive Detection of Hg(II) Ions, DOI: https://doi.org/10.1021/acsami.5b07900 (2015).
Man Zhang et al., Facile synthesis of Ni-, Co-, Cu-metal organic frameworks electrocatalyst boosting for hydrogen evolution reaction, DOI: https://doi.org/10.1016/j.jmst.2020.09.028 (2021).

* cited by examiner

*Primary Examiner* — John Kim
(74) *Attorney, Agent, or Firm* — Nath, Goldberg & Meyer; Joshua B. Goldberg

(57) ABSTRACT

A tri-metallic organic framework having the formula Bi$_x$Co$_y$Ni$_{(1-x-y)}$(BTC)(4,4'-bipy), its synthesis, and its use as a reduction catalyst.

20 Claims, 21 Drawing Sheets

TRI-METALLIC ORGANIC FRAMEWORK (MOF) COMPLEX AS A REDUCTION CATALYST

BACKGROUND

1. Field

The present disclosure relates to a tri-metallic organic framework (MOF) complex having the formula: $Bi_xCo_y\-Ni_{(1-x-y)}(BTC)(4,4'\text{-bipy})$, its synthesis, and its use as a reduction catalyst.

2. Description of the Related Art

About several million tons of dyes are synthesized yearly. About 15% of them are discharged as wastes in open waters including rivers and seas during dye production and dying processing. There have been several reports on the photo-degradation of methyl orange MO by nanomaterials. However, the photodegradation process can be long and costly.

Thus, there is an urgent need to treat wastewater and convert dye wastes from industry effluents like methyl orange to useful chemicals.

SUMMARY

The present subject matter relates to a preparation of a new metallic organic framework (MOF) materials and use thereof in the catalytic reduction of methyl orange (MO) dye. This represents a simple and low-cost technique compared to photodegradation.

The trimetallic organic framework catalysts can be prepared with and without porous carbon (PC) support. The metals used in the trimetallic organic framework can be Co, Ni, Bi, and the ligands can be 4,4' bipyridine (bpy) and 1,3,5 benzene tricarboxylic acid (BTC) in an appropriate ratio of mmol. The complexes can be prepared in a solvothermal steel apparatus. The starting materials can be metal salts and ligands which are mixed and heated at high temperature for several days for a MOF complex $(1)=Bi_xCo_yNi_{(1-x-y)}(BTC)(4,4'\text{-bipy})$ and for supported MOF complex $(1@PC)=Bi_xCo_yNi_{(1-x-y)}(BTC)(4,4'\text{-bipy})\text{-PC}$.

The advantage of using a porous carbon support (PC) is that it gives extra stability to an anchored MOF complex hindering and delaying the breakage of its coordination bonds during the catalytic reactions. Thus, the number of catalytic cycles of reduction of methyl orange into dimethyl phenyl diamine and sulfanilic acid derivative components increased from a total of 41.3 cycles for WJ 37=complex (1) to 58.8 cycles for WJ 37-PC=complex (1@PC) with turn-over number=0.1260 mmol MO/mg catalyst for (1) and = 0.1796 mmol MO/mg catalyst for (1@PC). The total time of the experiments was 205 min for (1) and 380 min for (1@PC).

In an embodiment, the present subject matter relates to a tri-metallic organic framework (MOF) complex comprising: cobalt; nickel; bismuth; 4,4' bipyridine ligands; and 1,3,5 benzene tricarboxylic acid ligands. The cobalt, nickel, and bismuth may be in an about 0.3:0.3:0.3 molar ratio.

In another embodiment, the present subject matter relates to a tri-metallic organic framework (MOF) complex having the formula: $Bi_xCo_yNi_{(1-x-y)}$ $(BTC)(4,4'\text{-bipy})$; wherein x=0.3 and y=0.3; wherein BTC is 1,3,5 benzene tricarboxylic acid bismuth; and 4,4'-bipy is 4,4'-bipyridine. The embodiment may further comprise porous carbon.

In one more embodiment, the present subject matter relates to a method of making a tri-metallic organic framework (MOF) complex having the formula $Bi_xCo_yNi_{(1-x-y)}$ $(BTC)(4,4'\text{-bipy})$, the method comprising: adding dimethyl-formamide (DMF), ethanol, and water to benzene tricarboxylic acid (BTC) and 4,4'-bipyridine (4,4'-bpy) to obtain a first reaction mixture; sonicating the first reaction mixture; adding $Co(Cl_2 \cdot 6H_2O)$, $NiCl_2 \cdot 6H_2O$, and $Bi(NO_3)_3 \cdot 5H_2O$ to the first reaction mixture to obtain a second reaction mixture; sonicating the second reaction mixture until the $Co(Cl_2 \cdot 6H_2O)$, $NiCl_2 \cdot 6H_2O$, and $Bi(NO_3)_3 \cdot 5H_2O$ are dissolved; heating the second reaction mixture; cooling, filtering, washing, and drying a precipitate; and obtaining the $Bi_xCo_yNi_{(1-x-y)}(BTC)(4,4'\text{-bipy})$ tri-metallic organic framework (MOF) complex.

These and other features of the present subject matter will become readily apparent upon further review of the following specification.

DETAILED DESCRIPTION OF THE PREFERRED EMBODIMENTS

Figure 1:
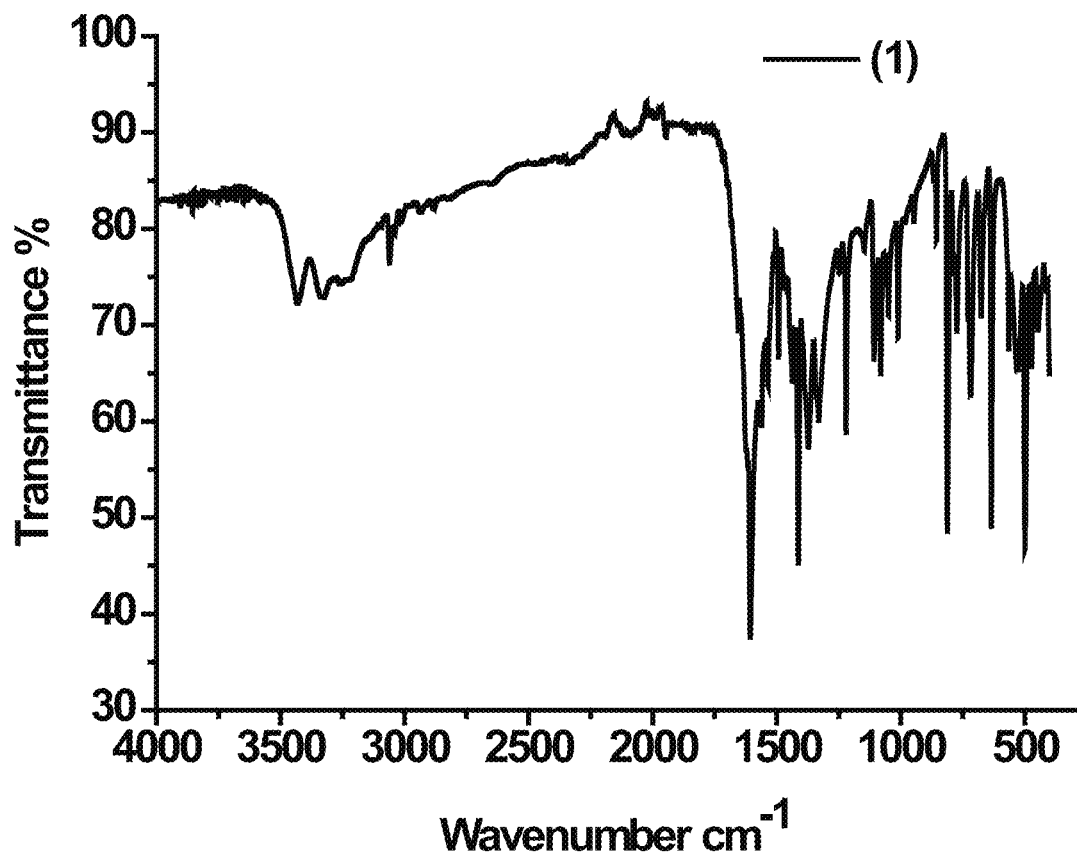
FIG. 1 shows a FTIR of Complex (1).

The following definitions are provided for the purpose of understanding the present subject matter and for construing the appended patent claims.

Definitions

Throughout the application, where compositions are described as having, including, or comprising specific components, or where processes are described as having, including, or comprising specific process steps, it is contemplated that compositions of the present teachings can also consist essentially of, or consist of, the recited components, and that the processes of the present teachings can also consist essentially of, or consist of, the recited process steps.

It is noted that, as used in this specification and the appended claims, the singular forms "a", "an", and "the" include plural references unless the context clearly dictates otherwise.

In the application, where an element or component is said to be included in and/or selected from a list of recited elements or components, it should be understood that the element or component can be any one of the recited elements or components, or the element or component can be selected from a group consisting of two or more of the recited elements or components. Further, it should be understood that elements and/or features of a composition or a method described herein can be combined in a variety of ways without departing from the spirit and scope of the present teachings, whether explicit or implicit herein.

The use of the terms "include," "includes", "including," "have," "has," or "having" should be generally understood as open-ended and non-limiting unless specifically stated otherwise.

The use of the singular herein includes the plural (and vice versa) unless specifically stated otherwise. In addition, where the use of the term "about" is before a quantitative value, the present teachings also include the specific quantitative value itself, unless specifically stated otherwise. As used herein, the term "about" refers to a ±10% variation from the nominal value unless otherwise indicated or inferred.

The term "optional" or "optionally" means that the subsequently described event or circumstance may or may not occur, and that the description includes instances where said event or circumstance occurs and instances in which it does not.

It will be understood by those skilled in the art with respect to any chemical group containing one or more substituents that such groups are not intended to introduce any substitution or substitution patterns that are sterically impractical and/or physically non-feasible.

Unless defined otherwise, all technical and scientific terms used herein have the same meaning as commonly understood to one of ordinary skill in the art to which the presently described subject matter pertains.

Where a range of values is provided, for example, concentration ranges, percentage ranges, or ratio ranges, it is understood that each intervening value, to the tenth of the unit of the lower limit, unless the context clearly dictates otherwise, between the upper and lower limit of that range and any other stated or intervening value in that stated range, is encompassed within the described subject matter. The upper and lower limits of these smaller ranges may independently be included in the smaller ranges, and such embodiments are also encompassed within the described subject matter, subject to any specifically excluded limit in the stated range. Where the stated range includes one or both of the limits, ranges excluding either or both of those included limits are also included in the described subject matter.

Throughout the application, descriptions of various embodiments use "comprising" language. However, it will be understood by one of skill in the art, that in some specific instances, an embodiment can alternatively be described using the language "consisting essentially of" or "consisting of".

"Subject" as used herein refers to any animal classified as a mammal, including humans, domestic and farm animals, and zoo, sports, and pet companion animals such as household pets and other domesticated animals such as, but not limited to, cattle, sheep, ferrets, swine, horses, poultry, rabbits, goats, dogs, cats and the like.

"Patient" as used herein refers to a subject in need of treatment of a condition, disorder, or disease, such as cancer.

For purposes of better understanding the present teachings and in no way limiting the scope of the teachings, unless otherwise indicated, all numbers expressing quantities, percentages or proportions, and other numerical values used in the specification and claims, are to be understood as being modified in all instances by the term "about". Accordingly, unless indicated to the contrary, the numerical parameters set forth in the following specification and attached claims are approximations that may vary depending upon the desired properties sought to be obtained. At the very least, each numerical parameter should at least be construed in light of the number of reported significant digits and by applying ordinary rounding techniques.

The present subject matter relates to a preparation of a new metallic organic framework (MOF) materials and use thereof in the catalytic reduction of methyl orange (MO) dye. This represents a simple and low-cost technique compared to photodegradation.

The trimetallic organic framework catalysts can be prepared with and without porous carbon (PC) support. The metals used in the trimetallic organic framework can be Co, Ni, Bi, and the ligands can be 4,4' bipyridine (bpy) and 1,3,5 benzene tricarboxylic acid (BTC) in an appropriate ratio of mmol. The complexes can be prepared in a solvothermal steel apparatus. The starting materials can be metal salts and ligands which are mixed and heated at high temperature for several days for a MOF complex $(1)=Bi_xCo_yNi_{(1-x-y)}(BTC)(4,4'-bipy)$ and for supported MOF complex $(1@PC)=Bi_xCo_yNi_{(1-x-y)}(BTC)(4,4'-bipy)-PC$.

The advantage of using a porous carbon support (PC) is that it gives extra stability to an anchored MOF complex hindering and delaying the breakage of its coordination bonds during the catalytic reactions. Thus, the number of catalytic cycles of reduction of methyl orange into dimethyl phenyl diamine and sulfanilic acid derivative components increased from a total of 41.3 cycles for WJ 37=complex (1) to 58.8 cycles for WJ 37-PC=complex (1@PC) with turnover number=0.1260 mmol MO/mg catalyst for (1) and =0.1796 mmol MO/mg catalyst for (1@PC). The total time of the experiments was 205 min for (1) and 380 min for (1@PC).

In an embodiment, the present subject matter relates to a tri-metallic organic framework (MOF) complex comprising: cobalt; nickel; bismuth; 4,4' bipyridine ligands; and 1,3,5 benzene tricarboxylic acid ligands.

In certain embodiments of the MOF complex, the cobalt, nickel, and bismuth may be present in an about 0.3:0.3:0.3 molar ratio.

In another embodiment, the MOF complex may be a complex.

In still another embodiment, the complex may further include porous carbon (PC).

The present subject matter further relates to a method of removing dye from water, such as wastewater, comprising adding an effective amount of the tri-metallic organic framework (MOF) as described herein to water. The method may also include adding $NaBH_4$ to the water. An effective amount of the MOF may be about 1 mg per about 41.3 mg of a dye. Removing the about 41.3 mg of the dye may take about 205 minutes.

In an embodiment, the present subject matter relates to a tri-metallic organic framework (MOF) complex having the formula $Bi_xCo_yNi_{(1-x-y)}$ (BTC)(4,4'-bipy); where x=0.3 and y=0.3, BTC is 1,3,5 benzene tricarboxylic acid, and 4,4'-bipy is 4,4'-bipyridine.

In some embodiments, the complex may be a catalyst. In various embodiments, the complex may further include porous carbon.

The present subject matter further relates to a method of removing dye from water, such as wastewater, comprising adding an effective amount of the tri-metallic organic framework (MOF) to water. The method may also include adding $NaBH_4$ to the water. An effective amount of the MOF may be about 1 mg per about 41.3 mg of a dye. Removing the about 41.3 mg of the dye may take about 205 minutes.

In one more embodiment, the present subject matter relates to a method of making the tri-metallic organic framework (MOF) complex having the formula $Bi_xCo_yNi_{(1-x-y)}$(BTC)(4,4'-bipy), the method comprising: adding dimethylformamide (DMF), ethanol and water to benzene tricarboxylic acid (BTC) and 4,4'-bipyridine (4,4'-bpy) to obtain a first reaction mixture; sonicating the first reaction mixture; adding $Co(Cl_2·6H_2O)$, $NiCl_2·6H_2O$, and $Bi(NO_3)_3·5H_2O$ to the first reaction mixture to obtain a second reaction mixture; sonicating the second reaction mixture until the $Co(Cl_2·6H_2O)$, $NiCl_2·6H_2O$, and $Bi(NO_3)_3·5H_2O$ are dissolved; heating the second reaction mixture; cooling, filtering, washing, and drying a precipitate; and obtaining the $Bi_xCo_yNi_{(1-x-y)}$(BTC)(4,4'-bipy) tri-metallic organic framework (MOF) complex.

In an embodiment of the present production methods, the benzene tricarboxylic acid (BTC) and 4,4'-bipyridine (4,4'-bpy) may be added in an about 1:1 molar ratio.

In another embodiment of the present production methods, the heating can be at a temperature of about 150° C., or from about 145° C. to about 155° C.

In a further embodiment of the present production methods, the second reaction mixture may be heated for about 24 hours.

In an embodiment of the present production methods, the precipitate may be cooled to room temperature. The precipitate can be washed with water and ethanol. The precipitate may be dried in an oven at about 80° C.

In an additional embodiment of the present production methods, the method may further comprise adding the $Co(Cl_2·6H_2O)$, $NiCl_2·6H_2O$, and $Bi(NO_3)_3·5H_2O$ to porous carbon.

The following examples relate to various methods of manufacturing the specific compounds and application of the same, as described herein. All compound numbers expressed herein are with reference to the synthetic pathway figures shown above.

EXAMPLES

Example 1

Synthesis of complex (1)=WJ 37=$Bi_xCo_yNi_{(1-x-y)}$ (BTC)(4,4'-bipy) (Complex 1=WJ 37)

In a flask containing 10 mL DMF, 1 mL ethanol and 1 mL water were added to benzene tricarboxylic acid (BTC)(0.1 gm, 0.48 mmole) and 4,4'-bipyridine (4,4'-bpy) (0.075 gm, 0.48 mmole) and dissolved by sonication. Then metals were added to the first mixture on the ligands as followed with continuous sonication to dissolved them: $Co(Cl_2·6H_2O)$ (0.171 gr, 0.72 mmole), $NiCl_2·6H_2O$ (0.171 gr, 0.72 mmole) and $Bi(NO_3)_3·5H_2O$ (0.349 gr, 0.72 mmole). Finally the mixture was transferred to an autoclave at 150° C. for 24 hours. After that a precipitate was cooled to room temperature, filtered, washed with water and ethanol, and dried in oven at 80° C. The yield was 0.66 gm.

FTIR spectroscopy of complex (1): Wavenumber $cm^{-1}$: 3431.6, 3325.8, 3060.7, 3011.8, 1946.6, 1654, 1606, 1534, 1491.9, 1437, 1413, 1372, 1330.7, 1247.8, 1220, 1147.6, 1107.8, 1080.5, 1062, 1049, 1010.5, 946.5, 855.9, 811.5, 774, 717, 684, 640.9, 569, 489, 392; as illustrated in FIG. 1.

Example 2

Synthesis of $Bi_xCo_yNi_{(1-x-y)}$(BTC)(4,4'-bipy)-porous carbon (PC) (Complex 1-PC=WJ 37-PC)

In flask containing 10 mL $H_2O$ porous carbon (0.006 gm 0.5 mmole) was added and dissolved by sonication. Then metals were added to the first mixture on the porous carbon as followed with continued sonication to dissolved them: $Co(Cl_2·6H_2O)$ (0.333 gm, 1.44 mmole), $NiCl_2·6H_2O$ (0.342 gm, 1.44 mmole), $Bi(NO_3)_3·5H_2O$ (0.698 gm, 1.44 mmole) to obtain a first mixture.

In a separate flask containing 10 mL DMF, BTC (0.1 gm, 0.48 mmole) and 4,4'-bipy (0.075 gm, 0.48 mmole) were added. All was dissolved by sonication. Then the contents of the separate flask were added to the first mixture with continuous sonication. Finally, the mixture was transferred to an autoclave at 170° C. for 48 hours. After that the precipitate was cooled to room temperature, centrifuged, wash with water and ethanol, and dried in an oven at 60° C. for 4 hours. Then the precipitate was dried at room temperature for one day. The yield was 0.67 gm.

Figure 2:
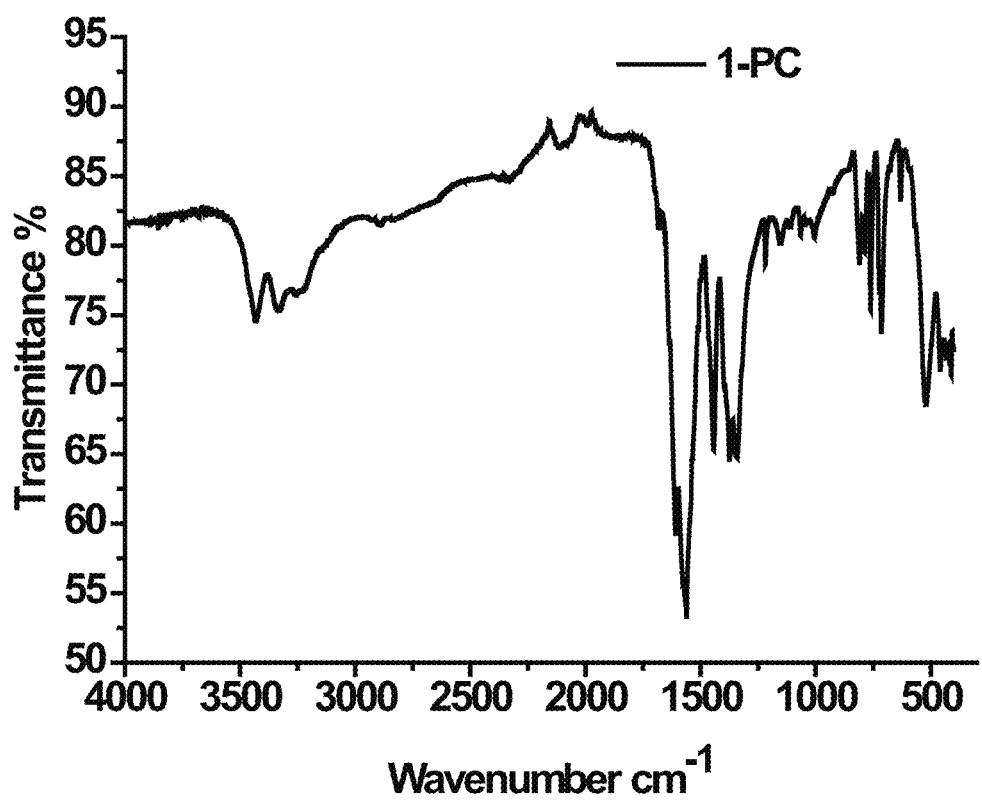
FIG. 2 shows a FTIR of Complex (1-PC).

FTIR spectroscopy of Complex (1-PC): Wavenumber $cm^{-1}$: 3432.8, 3335, 3229.5, 2888.9, 2339, 2098, 1607.5, 1560, 1442.9, 1373.8, 1341, 1217.9, 1152.9, 1065.5, 1005, 809, 787, 761, 714, 631.6, 517, 463, 409; as illustrated in FIG. 2.

Example 3

Catalytic Study of Complex (1) of Example 1

UV-Vis Spectroscopy Progress of Catalytic Reduction of MO by Complex (1) Catalyst of Example 1

Figure 3:
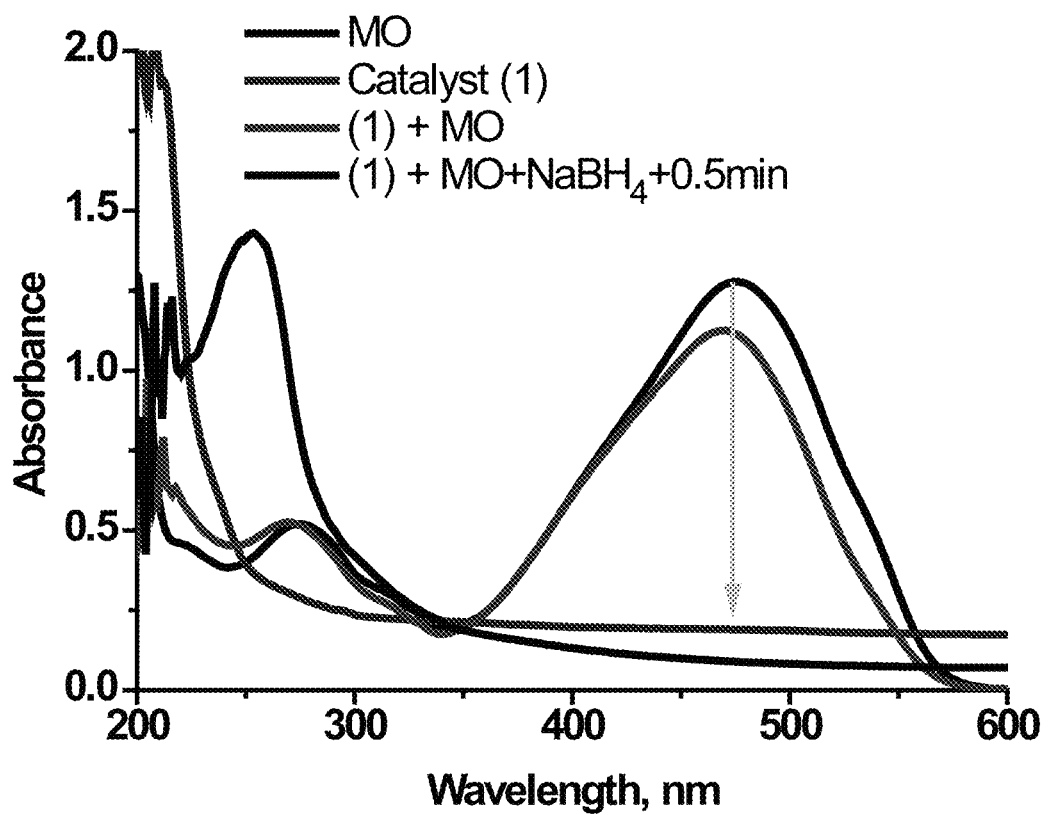
FIG. 3 shows a UV-visible absorption spectra progress of reduction reaction of MO dye by complex (1)=WJ37 (1).
Figure 4A:
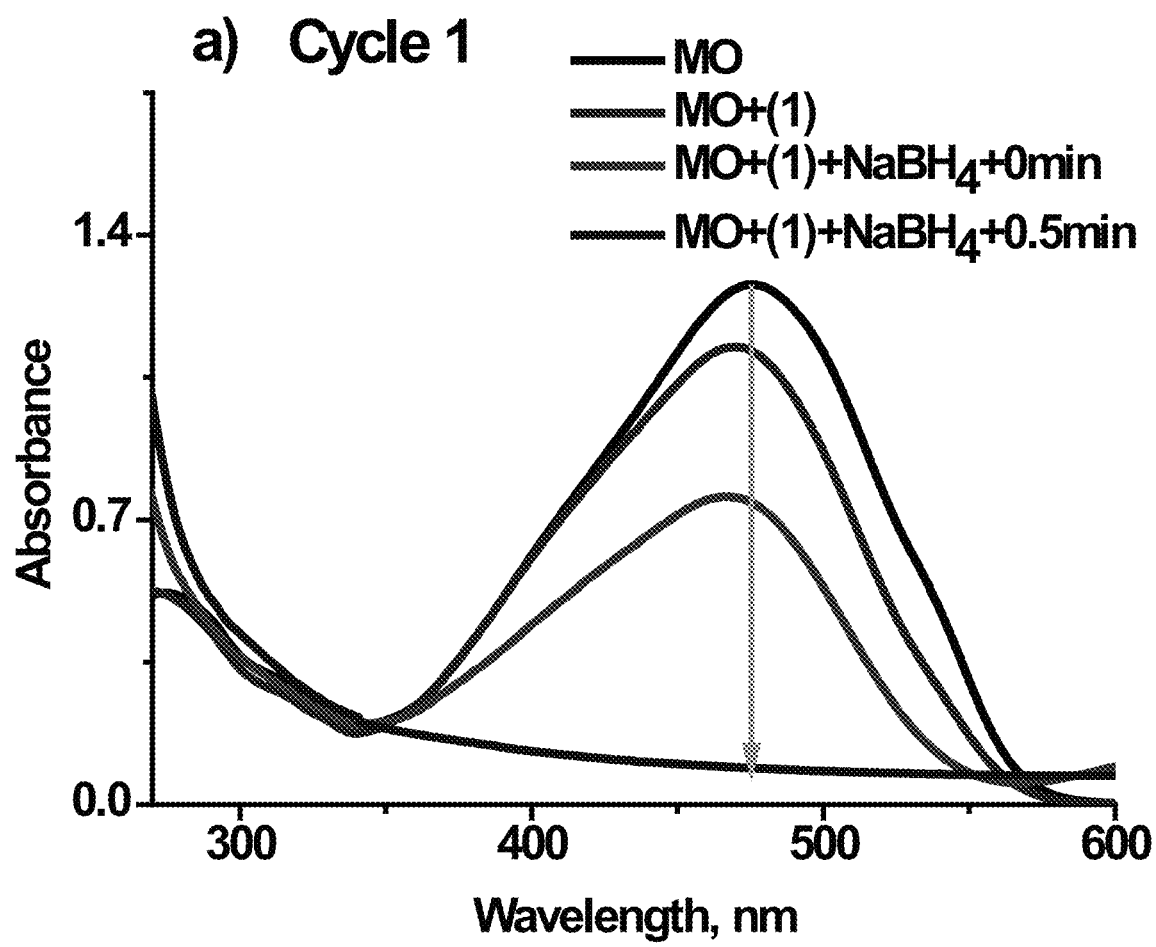
FIGS. 4A, 4B, 4C, and 4D show catalytic activity of catalyst (Compound 1) on Reduction of MO in presence $NaBH_4$ at Cycle 1 (FIG. 4A), Cycle 22 (FIG. 4B), Cycle 30 (FIG. 4C), and Cycle 40 (FIG. 4D).
Figure 4B:
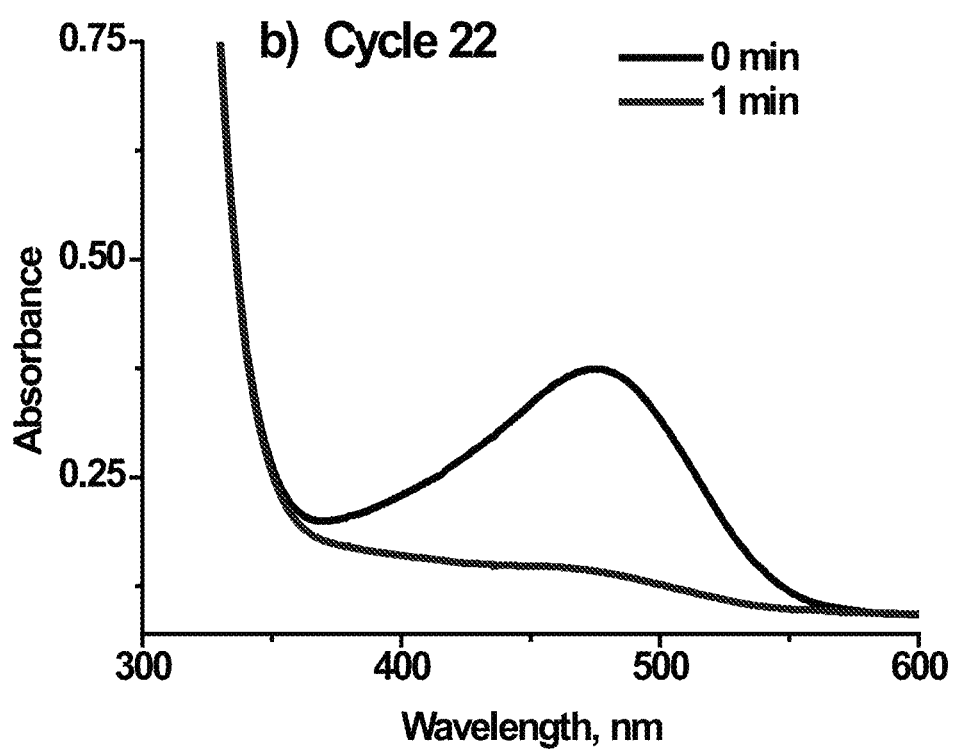
Figure 4C:
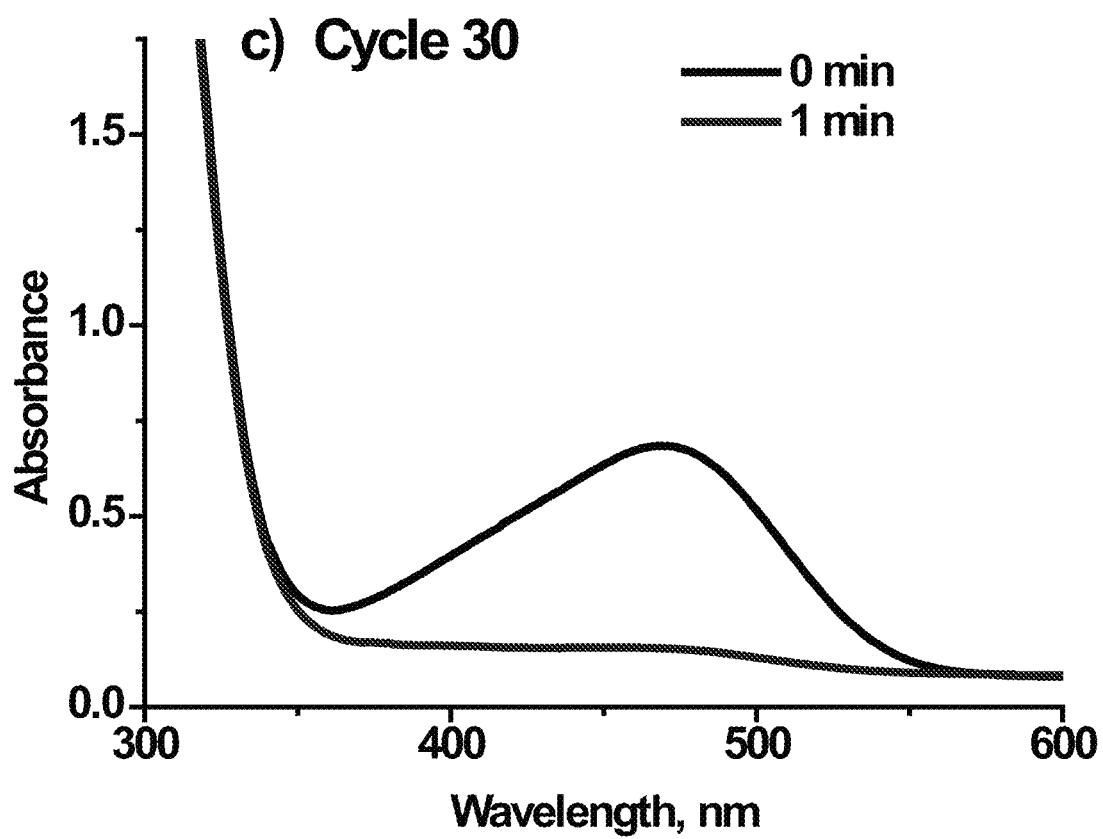
Figure 4D:
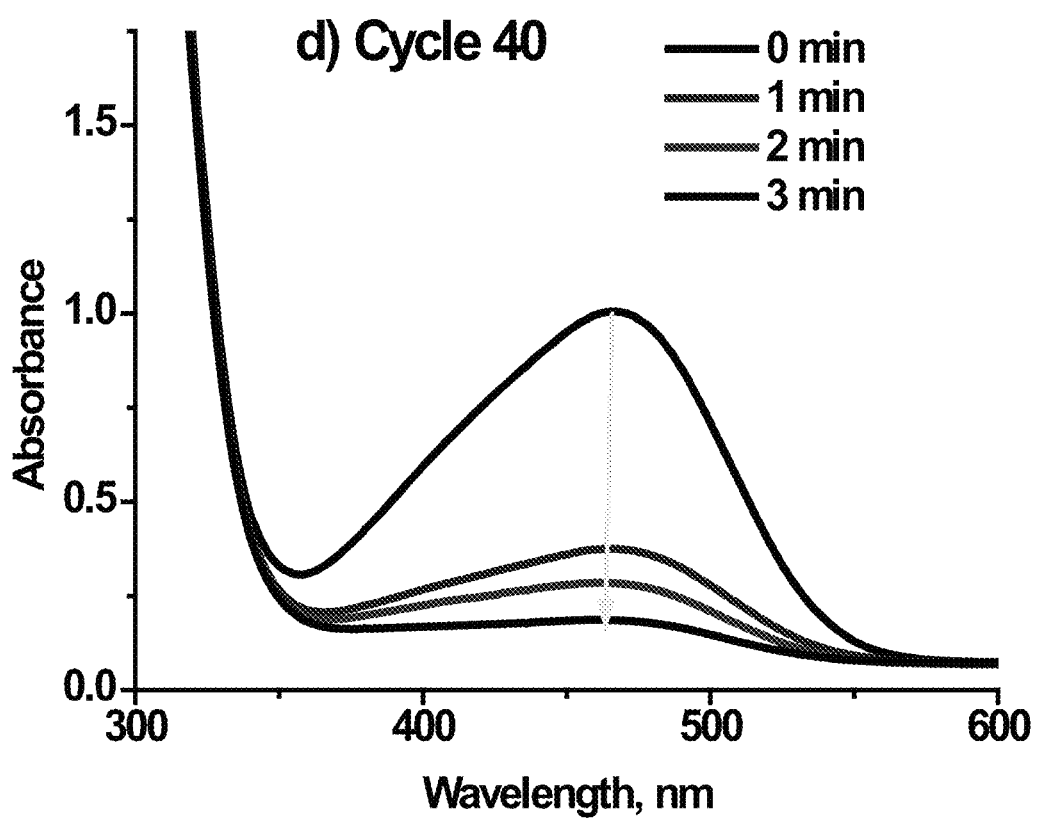
Figure 5A:
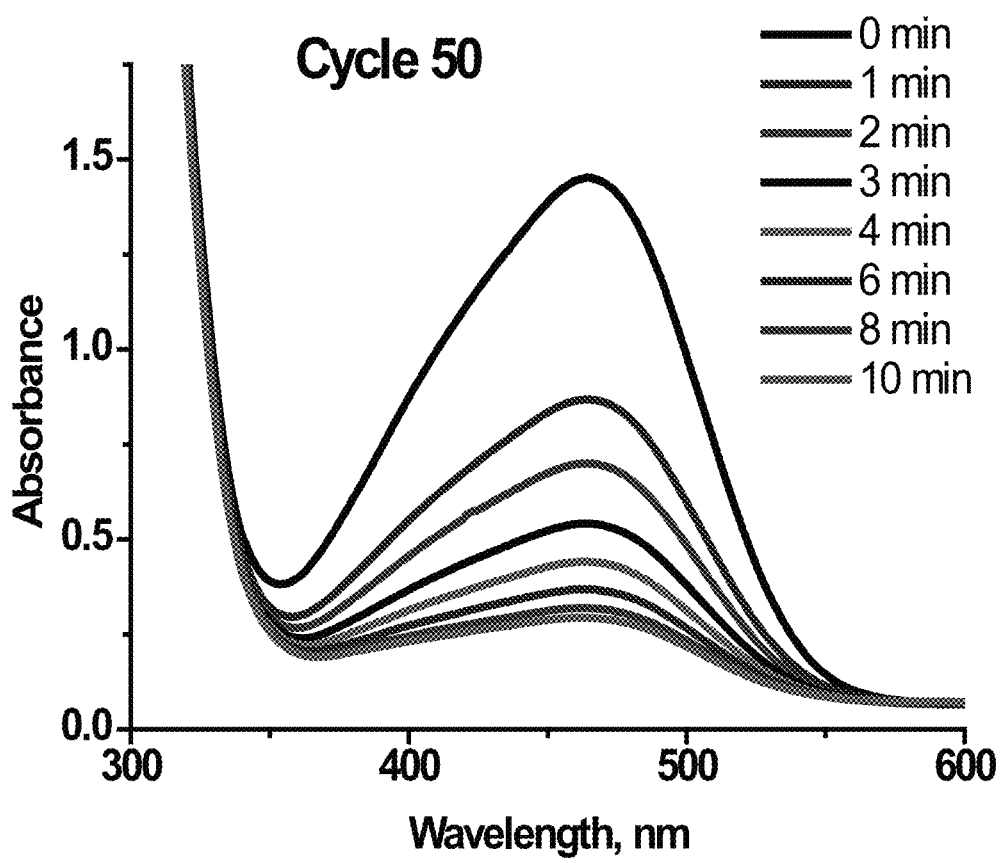
FIGS. 5A and 5B show catalytic activity and kinetic rate of catalyst (compound 1) in cycle 50 on Reduction of MO in presence $NaBH_4$.
Figure 5B:
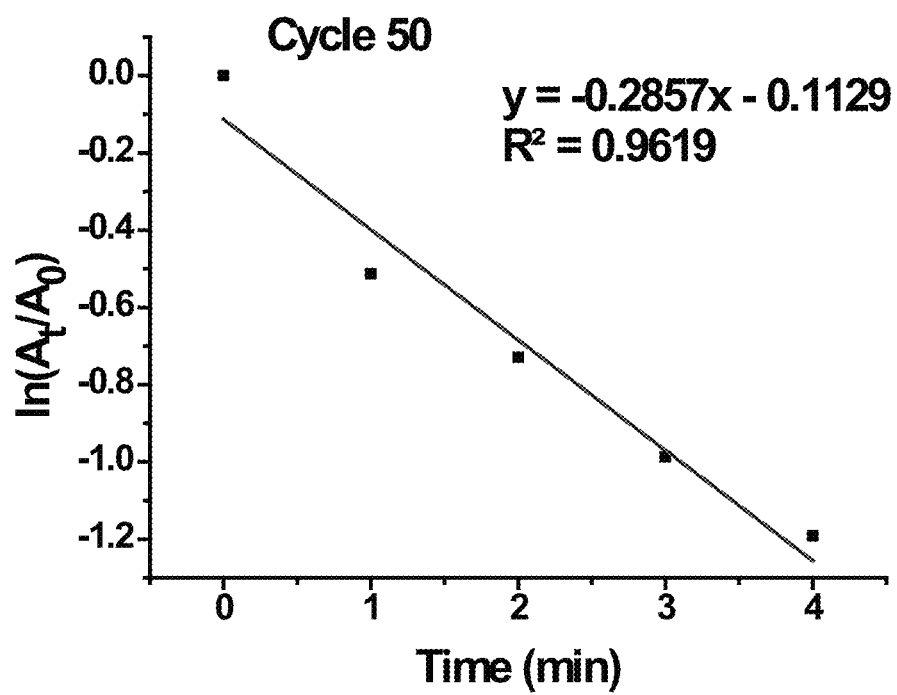

Methyl orange (MO) was chosen as a model organic dye, with $NaBH_4$ as a reducing agent. In a typical degradation process, an aqueous suspension of catalysts (1 mg catalyst/1 ml water) was ultrasonically treated. A 0.2 ml of the previous solution, 2.5 ml of distilled water, 0.05 ml of MO in water (32 mg MO/25 ml water) added for each cycle, and 4 mg $NaBH_4$ were mixed in a quartz cuvette. The catalytic degradation process of MO was assessed by monitoring the change in intensity of the UV-visible absorption peak of MO at different time. The reduction is considered complete when the absorbance peak at A max 464 nm decreased to almost zero; FIG. 3. Examples of catalytic cycles were presented in FIGS. 4A, 4B, 4C, and 4D. The kinetics rate first order plot of a selected cycle 50 was presented in FIGS. 5A and 5B. In conclusion, 0.2 mg of complex (1) achieved 50 cycles and was still in good shape to do more cycles, without the need for regeneration.

Batch (Reactor) Experiment of MO by Catalyst Complex (1) of Example 1

Figure 6:
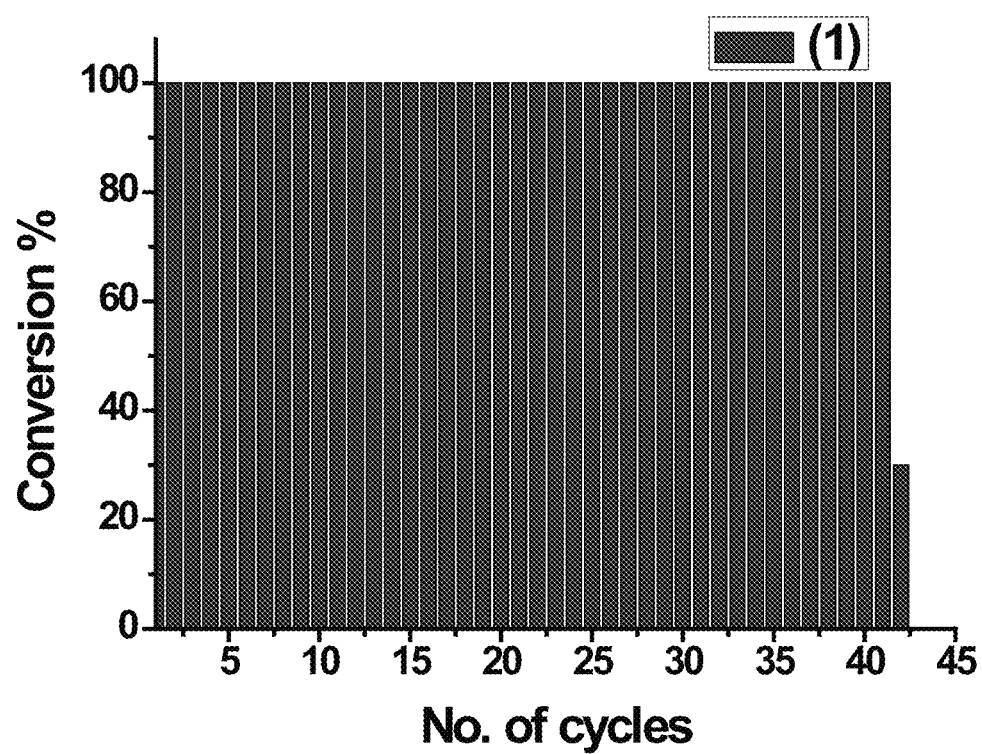
FIG. 6 shows Cycle catalytic reduction of MO in flask containing 1 mg of catalyst (Compound-1) using 10 mL water and 15 mg $NaBH_4$. Quantities of 1 mg MO was added for each cycle.

Cyclic catalytic reduction of MO in a flask containing 1 mg of complex (1), 15 mg $NaBH_4$, and 10 ml of water. The addition amount was 1 mg of MO for each cycle. Catalyst (1) was used to treat 41.3 mg of MO in 41.3 cycles at about 205 min without the need of regeneration, FIG. 6

The turn over number TON=41.3 mg MO/1 mg catalyst or (0.126 mmole MO/mg catalyst). While the turn over frequency TOF=TON/time=41.3/205 min=0.20146 (mg MO/mg catalyst)/min or $(6.15 \times 10^{-4})$ (mmole MO/mg catalyst)/min. The data was presented in detail in summary in Table 1 and in detail in Table 2.

TABLE 1

Table 1.
Catalytic reduction of MO by 1 mg of catalyst (Compound-1) in presence of $NaBH_4$.

| No. of cycles | All Time (min) | MO (mg) | Amount of $NaBH_4$ (mg) | TON mg MO/mg catalyst or (mmole MO/mg nano) | TOF (mg MO/mg catalyst)/min or [(mmole MO/mg catalyst)/min] |
|---|---|---|---|---|---|
| 41.3 | 205 | 41.3 | 15 | 41.3 or (0.126) | 0.20146 [6.15 × 10⁻⁴] |

A 1 mg of MO was added for each cycle.

TABLE 2

Table 2.
Catalytic reduction of MO by 1 mg of catalyst (1) in presence of $NaBH_4$.

| No. of cycles | Time (min) | MO (mg) | Amount of $NaBH_4$ |
|---|---|---|---|
| 1 | 1 | 1 | 10 mg $NaBH_4$ |
| 2 | 0.5 | 1 | |
| 3 | 0.5 | 1 | |
| 4 | 0.5 | 1 | |
| 5 | 0.5 | 1 | |
| 6 | 1 | 1 | |
| 7 | 2 | 1 | |
| 8 | 4 | 1 | |
| 9 | 4 | 1 | |
| 10 | 4 | 1 | |
| 11 | 4 | 1 | |
| 12 | 5 | 1 | |
| 13 | 5 | 1 | |
| 14 | 5 | 1 | |
| 15 | 6 | 1 | |
| 16 | 6 | 1 | |
| 17 | 6 | 1 | |
| 18 | 6 | 1 | |
| 19 | 6 | 1 | |
| 20 | 6 | 1 | |
| 21 | 6 | 1 | |
| 22 | 6 | 1 | |
| 23 | 6 | 1 | |
| 24 | 6 | 1 | |
| 25 | 9 | 1 | |
| 26 | 2 | 1 | 5 mg $NaBH_4$ |
| 27 | 3 | 1 | |
| 28 | 3 | 1 | |
| 29 | 3 | 1 | |
| 30 | 3 | 1 | |
| 31 | 4 | 1 | |
| 32 | 4 | 1 | |
| 33 | 4 | 1 | |
| 34 | 4 | 1 | |
| 35 | 5 | 1 | |
| 36 | 5 | 1 | |
| 37 | 5 | 1 | |
| 38 | 6 | 1 | |
| 39 | 8 | 1 | |
| 40 | 8 | 1 | |
| 41 | 12 | 1 | |
| 42 | 20 | 0.3 (The color does not disappear) | |
| Total (41.3 cycles) | 205 min | 41.3 mg MO | 15 mg $NaBH_4$ |

Example 4

Catalytic Study of Complex (1-PC) of Example 2

UV-Vis Spectroscopy Progress of Catalytic Reduction of MO by Complex (1-PC) Catalyst.

Figure 7:
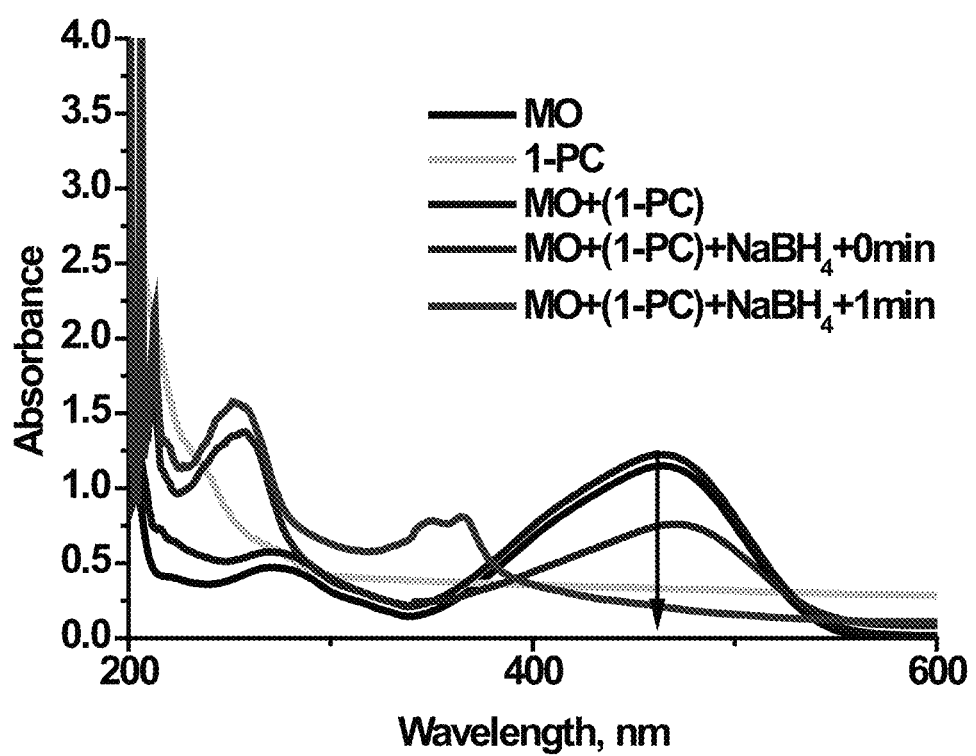
FIG. 7 shows UV-visible absorption spectra progress of reduction reaction of MO dye by (1-PC).
Figure 8A:
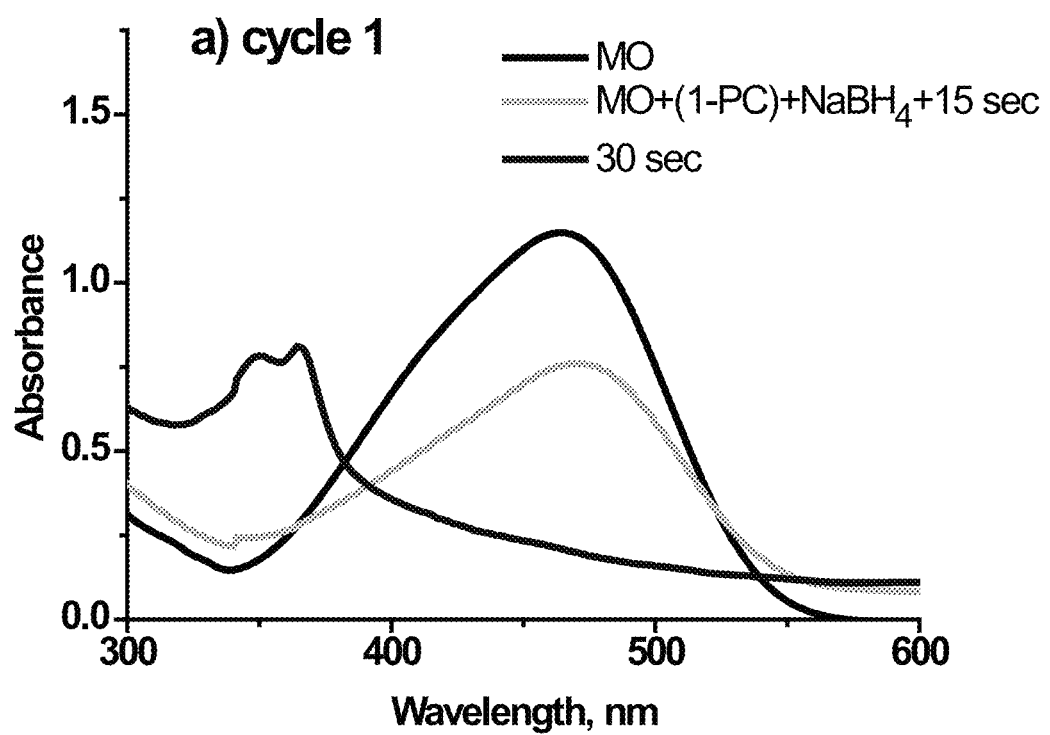
FIGS. 8A, 8B, 8C, 8D, 8E, and 8F show Catalytic activity and kinetic rate of catalyst (1-PC) on Reduction of MO in presence $NaBH_4$ at Cycle 1 (FIG. 8A), Cycle 22 (FIG. 8B), Cycle 30 (FIG. 8C), Cycle 40 (FIG. 8D), Cycle 50 (FIG. 8E), and Cycle 60 (FIG. 8F).
Figure 8B:
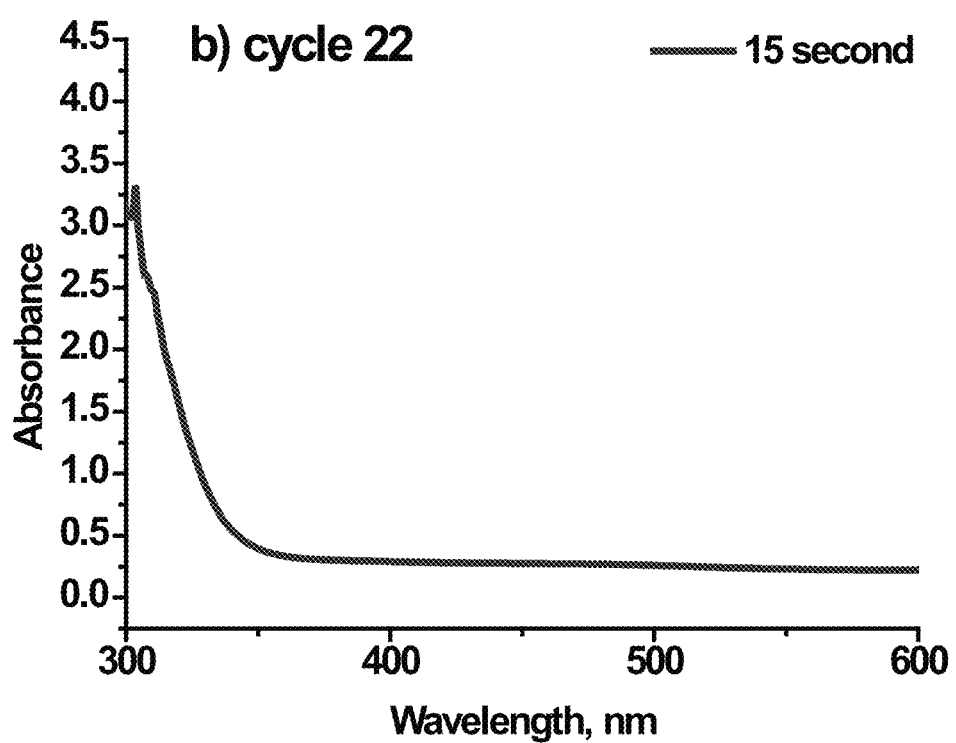
Figure 8C:
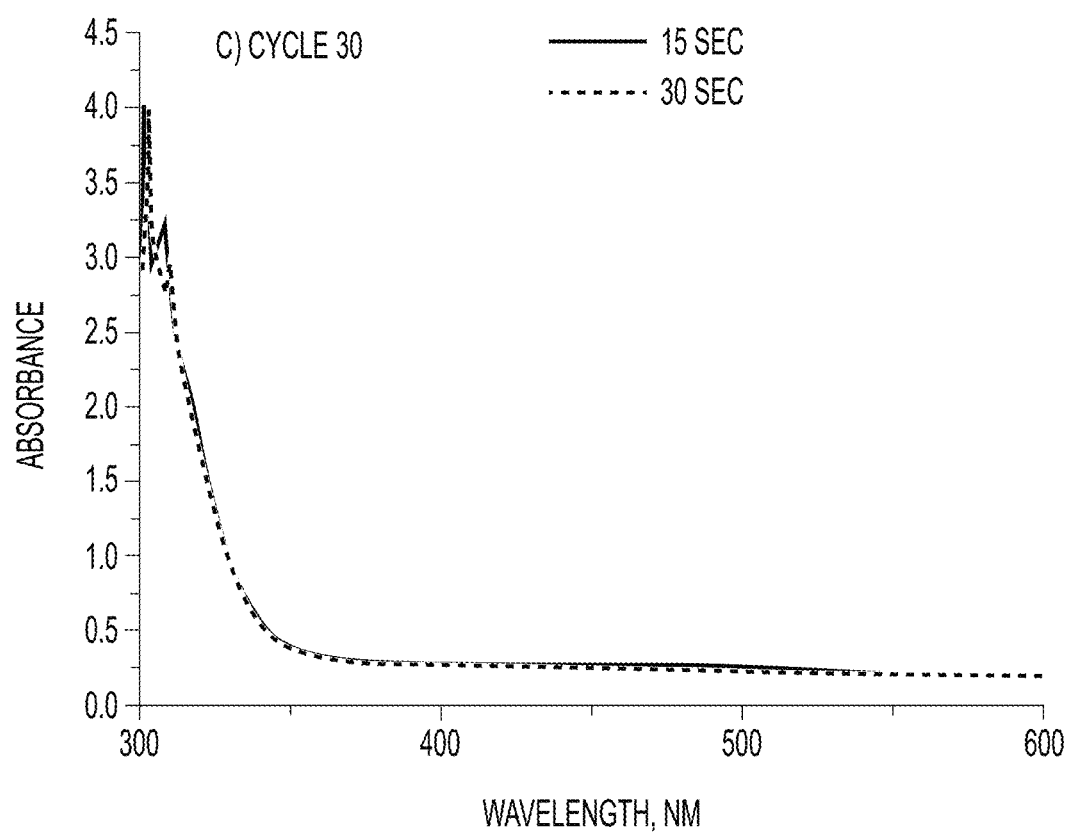
Figure 8D:
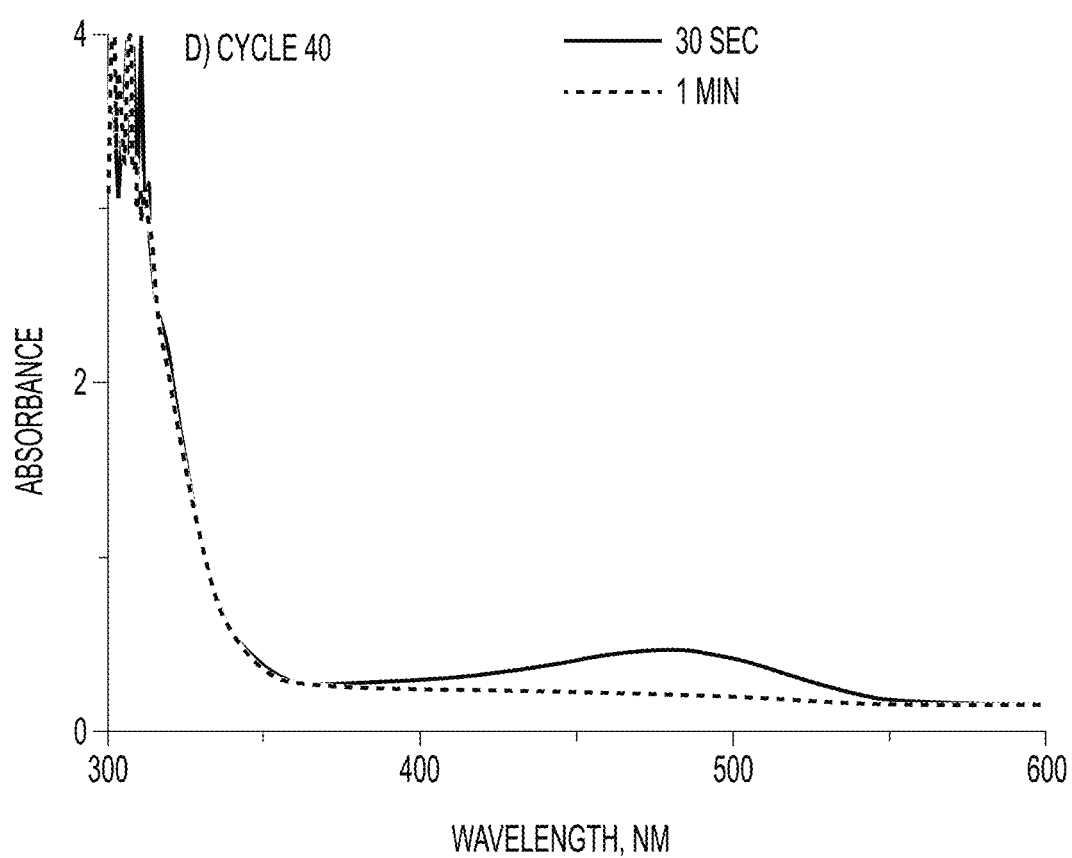
Figure 8E:
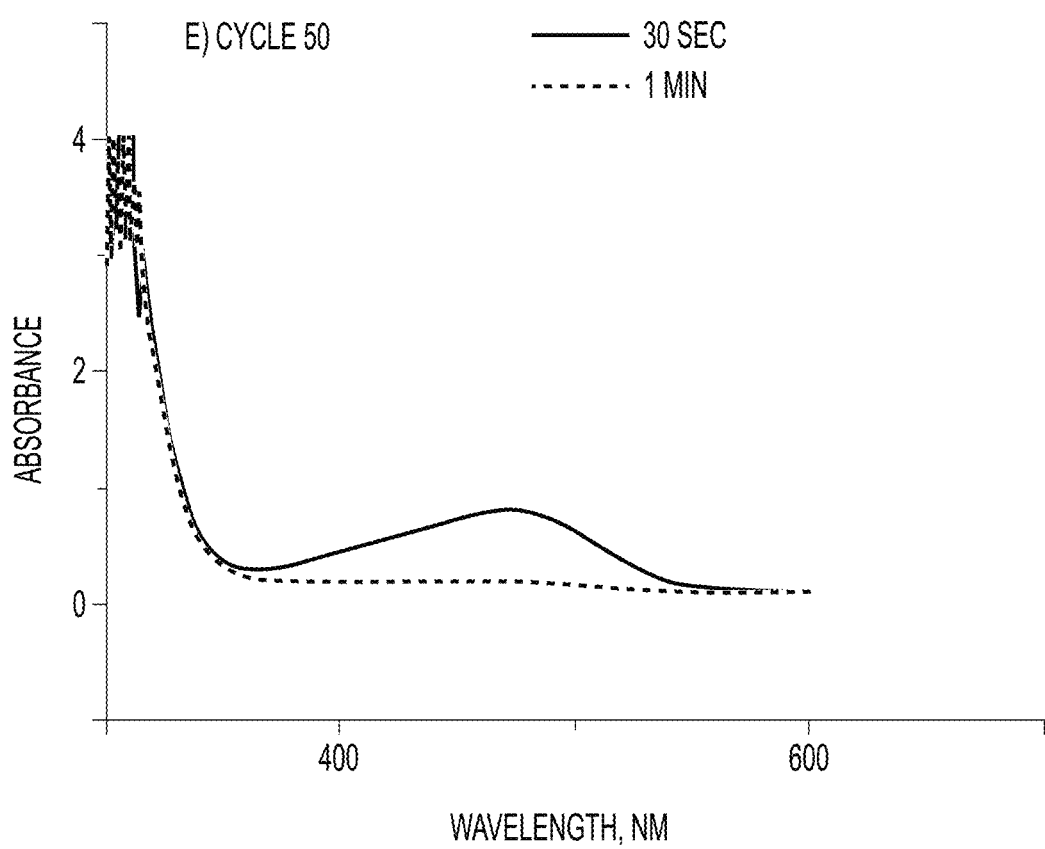
Figure 8F:
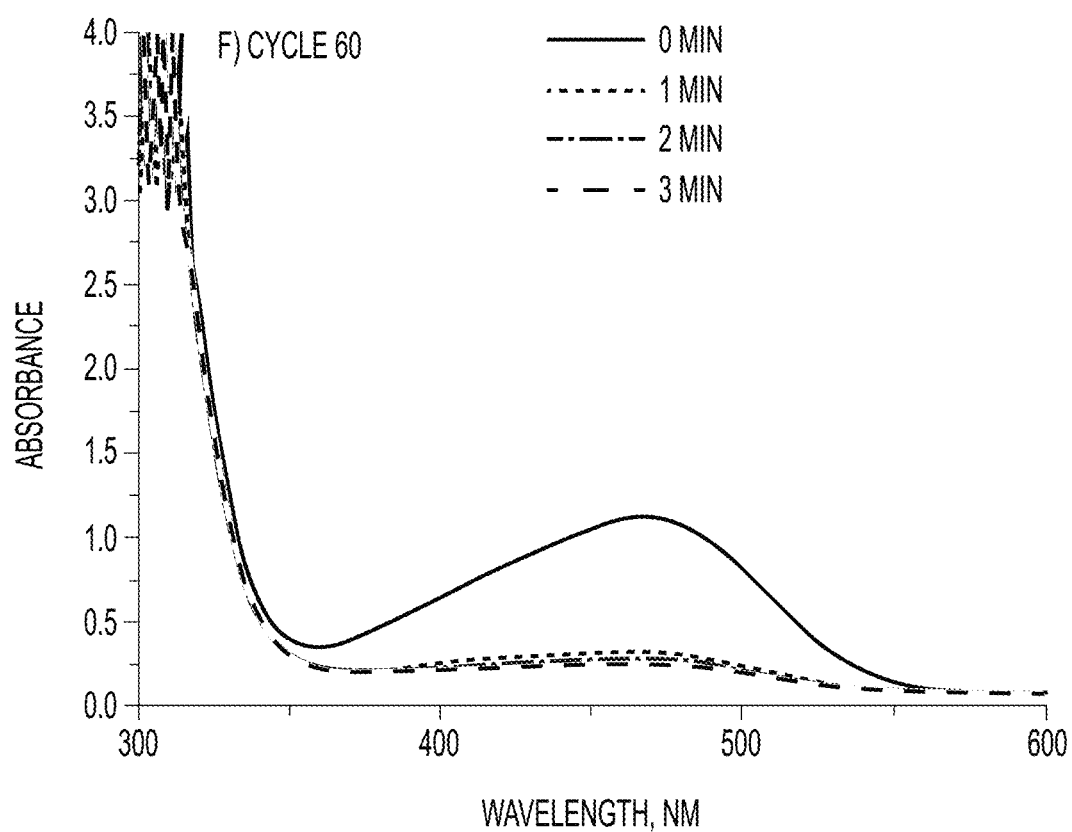
Figure 9A:
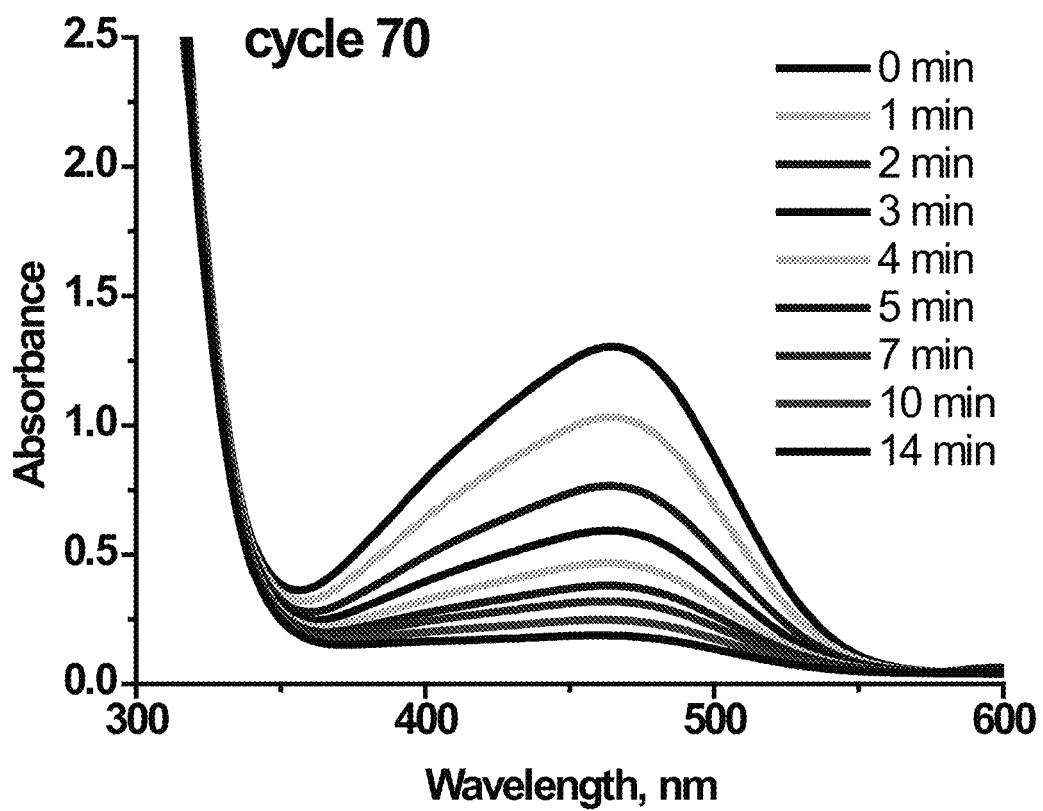
FIGS. 9A and 9B show Catalytic activity and kinetic rate of catalyst (1-PC) on Reduction of MO in presence $NaBH_4$.
Figure 9B:
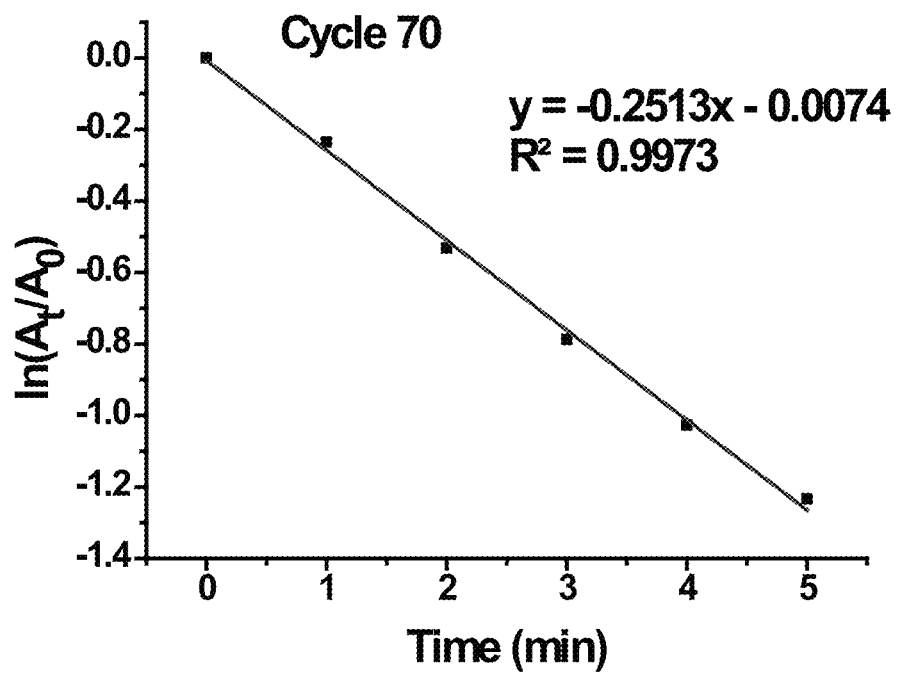

The same procedure was followed as above for catalyst (1). The reduction is considered complete when the absorbance peak at λ max 464 nm decreased to almost zero; FIG. 7. Examples of catalytic cycles for catalyst (1-PC) were presented in FIGS. 8A (cycle 1), 8B (cycle 22), 8C (cycle 30), 8D (cycle 40), 8E (cycle 50), and 8F (cycle 60). The kinetics rate first order plot of a selected cycle 70 was presented in FIGS. 9A and 9B. In conclusion, 0.2 mg of complex (1) achieved 70 cycles and still good to do extra more cycles, without the need for regeneration.

Batch (Reactor) Experiment of MO by Catalyst (1-PC)

Figure 10:
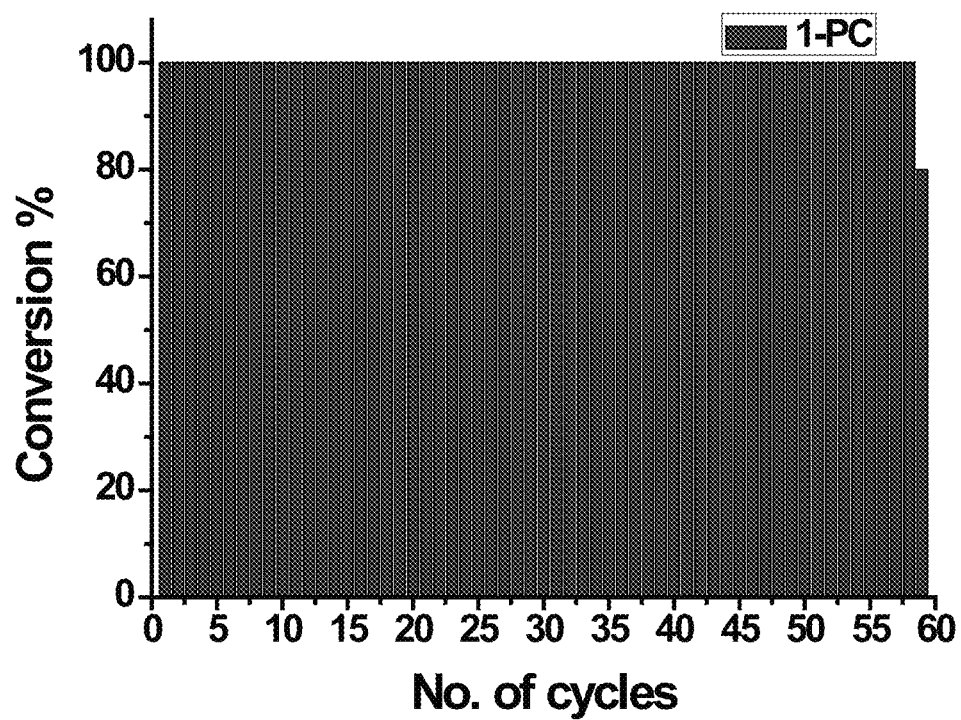
FIG. 10 shows Cycle catalytic reduction of MO in flask containing 1 mg of catalyst (1-PC), 10 mL water and 20 mg $NaBH_4$. Quantities of 1 mg MO was added for each cycle.

Cyclic catalytic reduction of MO in a flask containing 1 mg of (1-PC), 20 mg $NaBH_4$, and 10 ml of water. The addition amount was 1 mg of MO for each cycle. Catalyst (1-PC) was used to treat 58.8 mg of MO in 58.8 cycles at about 380 min, without the need for regeneration, FIG. 10.

The turn over number TON=58.8 mg MO/1 mg nano=58.8 mg MO/mg nano or (0.1796 mmole MO/mg nano). While the turn over frequency TOF=TON/time=58.8/380 min=0.1547 (mg MO/mg nano)/min or $(4.73 \times 10^{-4})$ (mmole MO/mg nano)/min. The data was presented in detail in summary in Table 3 and in detail in Table 4.

TABLE 3

Table 3.
Catalytic reduction of MO by 1 mg of catalyst (1-PC) in presence of $NaBH_4$.

| No. of cycles | All Time (min) | MO (mg) | Amount of $NaBH_4$ (mg) | TON mg MO/mg catalyst (mmole MO/mg catalyst) | TOF (mg MO/mg nano)/min [(mmole MO/mg catalyst)/min] |
|---|---|---|---|---|---|
| 58.8 | 380 min | 58.8 | 20 | 58.8 (0.1796) | 0.1547 [4.73 × 10⁻⁴] |

A 1 mg of MO was added for each cycle.

TABLE 4

Table 4.
Catalytic reduction of MO by
1 mg of catalyst (1-PC) in presence of $NaBH_4$.

| No. of cycles | Time (min) | MO (mg) | Amount of $NaBH_4$ |
|---|---|---|---|
| 1 | 1.5 | 1 | 10 mg $NaBH_4$ |
| 2 | 1.5 | 1 | |
| 3 | 1.5 | 1 | |
| 4 | 2 | 1 | |
| 5 | 2.5 | 1 | |
| 6 | 3 | 1 | |
| 7 | 4 | 1 | |
| 8 | 4 | 1 | |
| 9 | 5 | 1 | |
| 10 | 5 | 1 | |
| 11 | 6 | 1 | |
| 12 | 7 | 1 | |
| 13 | 7 | 1 | |
| 14 | 7 | 1 | |
| 15 | 8 | 1 | |
| 16 | 8 | 1 | |
| 17 | 8 | 1 | |
| 18 | 8 | 1 | |
| 19 | 8 | 1 | |
| 20 | 9 | 1 | |
| 21 | 9 | 1 | |
| 22 | 3 | 1 | 5 mg $NaBH_4$ |
| 23 | 3 | 1 | |
| 24 | 3 | 1 | |
| 25 | 3 | 1 | |
| 26 | 3 | 1 | |
| 27 | 3 | 1 | |
| 28 | 4 | 1 | |
| 29 | 4 | 1 | |
| 30 | 4 | 1 | |
| 31 | 5 | 1 | |
| 32 | 5 | 1 | |
| 33 | 5 | 1 | |
| 34 | 5 | 1 | |
| 35 | 6 | 1 | |
| 36 | 6 | 1 | |
| 37 | 6 | 1 | |
| 38 | 7 | 1 | |
| 39 | 7 | 1 | |
| 40 | 8 | 1 | |
| 41 | 8 | 1 | |
| 42 | 10 | 1 | |
| 43 | 12 | 1 | |
| 44 | 12 | 1 | |
| 45 | 12 | 1 | |
| 46 | 6 | 1 | 5 mg $NaBH_4$ |
| 47 | 6 | 1 | |
| 48 | 6 | 1 | |
| 49 | 6 | 1 | |
| 50 | 7 | 1 | |
| 51 | 7 | 1 | |
| 52 | 7 | 1 | |
| 53 | 7 | 1 | |
| 54 | 8 | 1 | |
| 55 | 9 | 1 | |
| 56 | 10 | 1 | |
| 57 | 12 | 1 | |
| 58 | 15 | 1 | |
| 59 | 17 | 0.8 (The color does not complete disappear) | |
| Total (58.8 cycles) | 380 min | 58.8 mg MO | 20 mg $NaBH_4$ |

Figure 11:
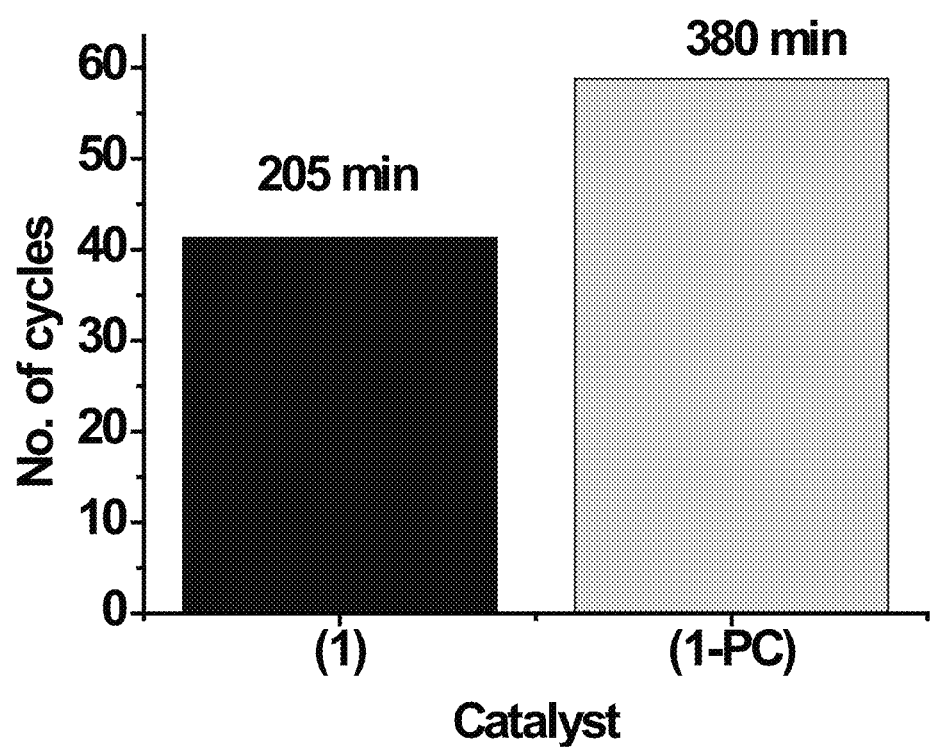
FIG. 11 shows a Comparison of cycle numbers of using the different Catalyst (1) and (1-PC).

Finally, FIG. 11 compared the cycle numbers and duration of experiment by using different Catalyst (1) and (1-PC).

It is to be understood that the 2-(1-(2-hydroxypropyl)-4,5-diphenyl-1H-imidazol-2-yl)pyridine compound, compositions containing the same, and methods of using and producing the same are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

We claim:

1. A tri-metallic organic framework (MOF) complex comprising:
    cobalt;
    nickel;
    bismuth;
    4,4' bipyridine ligands; and
    1,3,5 benzene tricarboxylic acid ligands.

2. The MOF claim 1, wherein the cobalt, nickel, and bismuth are in an about 0.3:0.3:0.3 molar ratio.

3. The MOF of claim 1, wherein the complex is a catalyst.

4. The MOF claim 1, further comprising porous carbon (PC).

5. A method of removing dye from wastewater comprising adding an effective amount of the tri-metallic organic framework (MOF) of claim 1 to the wastewater.

6. The method of claim 5, further comprising adding $NaBH_4$ to the wastewater.

7. The method of claim 5, wherein an effective amount of MOF is about 1 mg per about 41.3 mg of dye.

8. The method of claim 7, wherein removing about 41.3 mg of the dye from the wastewater takes about 205 minutes.

9. A tri-metallic organic framework (MOF) complex having the formula:
    $Bi_xCo_yNi_{(1-x-y)}(BTC)(4,4'-bipy)$;
    wherein x=0.3 and y=0.3;
    wherein BTC is benzene tricarboxylic acid bismuth; and
    4,4'-bipy is 4,4'-bipyridine.

10. The tri-metallic organic framework (MOF) of claim 9, wherein the complex is a catalyst.

11. The tri-metallic organic framework (MOF) of claim 9, further comprising porous carbon (PC).

12. A method of removing dye from wastewater comprising adding an effective amount of the tri-metallic organic framework (MOF) of claim 9 to the wastewater.

13. The method of claim 12, further comprising adding $NaBH_4$ to the wastewater.

14. The method of claim 13, wherein an effective amount of MOF is about 1 mg per about 41.3 mg of dye.

15. The method of claim 14, wherein removing 41.3 mg of the dye takes about 205 minutes.

16. A method of making the tri-metallic organic framework (MOF) complex having the formula $Bi_xCo_yNi_{(1-x-y)}(BTC)(4,4'-bipy)$ of claim 1, the method comprising:
    adding dimethylformamide (DMF), ethanol, and water to benzene tricarboxylic acid (BTC) and 4,4'-bipyridine (4,4'-bipy) to obtain a first reaction mixture;
    sonicating the first reaction mixture;
    adding $Co(Cl_2 \cdot 6H_2O)$, $NiCl_2 \cdot 6H_2O$, and $Bi(NO_3)_3 \cdot 5H_2O$ to the first reaction mixture to obtain a second reaction mixture;
    sonicating the second reaction mixture until the $Co(Cl_2 \cdot 6H_2O)$, $NiCl_2 \cdot 6H_2O$, and $Bi(NO_3)_3 \cdot 5H_2O$ are dissolved;
    heating the second reaction mixture;
    cooling, filtering, washing, and drying a precipitate; and
    obtaining the $Bi_xCo_yNi_{(1-x-y)}(BTC)(4,4'-bipy)$ tri-metallic organic framework (MOF) complex.

17. The method of making the tri-metallic organic framework (MOF) complex of claim 16, wherein the benzene tricarboxylic acid (BTC) and 4,4'-bipyridine (4,4'-bpy) are added in an about 1:1 molar ratio.

18. The method of making the tri-metallic organic framework (MOF) complex of claim 16, wherein heating is at a temperature of about 150° C. for about 24 hours.

19. The method of making the tri-metallic organic framework (MOF) complex of claim 16, wherein the precipitate is cooled to room temperature and washed with water and ethanol.

20. The method of making the tri-metallic organic framework (MOF) complex of claim 16, further comprising adding the $Co(Cl_2 \cdot 6H_2O)$, $NiCl_2 \cdot 6H_2O$, and $Bi(NO_3)_3 \cdot 5H_2O$ to porous carbon.

* * * * *